(12) United States Patent
Fujimoto (10) Patent No.: US 9,505,427 B2
(45) Date of Patent: Nov. 29, 2016

(54) ELECTRICAL CONNECTOR ASSEMBLY, ELECTRONIC CONTROL UNIT USING SAME, AND ELECTRIC POWER STEERING SYSTEM THEREWITH

(71) Applicant: Hitachi Automotive Systems, Ltd., Hitachinaka-shi, Ibaraki (JP)

(72) Inventor: Masao Fujimoto, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/837,062

(22) Filed: Aug. 27, 2015

(65) Prior Publication Data

US 2016/0064853 A1 Mar. 3, 2016

(30) Foreign Application Priority Data

Sep. 3, 2014 (JP) ................................. 2014-178803

(51) Int. Cl.
*H01R 13/52* (2006.01)
*B62D 5/04* (2006.01)
*H01R 43/00* (2006.01)

(52) U.S. Cl.
CPC ............. *B62D 5/046* (2013.01); *B62D 5/0406* (2013.01); *B62D 5/0421* (2013.01); *H01R 13/5216* (2013.01); *H01R 43/005* (2013.01); *H01R 2201/26* (2013.01)

(58) Field of Classification Search
CPC .......... H01R 13/5205; H01R 13/5202; H01R 13/516; B62D 5/0406; B62D 5/0421; B62D 5/046

USPC .................. 180/443, 444, 446; 439/271, 587
See application file for complete search history.

(56) References Cited

U.S. PATENT DOCUMENTS

| | | | | |
|---|---|---|---|---|
| 5,957,715 | A | * | 9/1999 | Fukuda .............. H01R 13/5219 439/271 |
| 6,843,677 | B2 | * | 1/2005 | Fukuda .............. H01R 33/7664 439/374 |
| 2013/0062137 | A1 | * | 3/2013 | Motoda ................ B62D 5/0406 180/446 |
| 2013/0189867 | A1 | * | 7/2013 | Cameron ........... H01R 13/5202 439/271 |
| 2014/0017951 | A1 | * | 1/2014 | Tsai ..................... H01R 13/516 439/638 |

FOREIGN PATENT DOCUMENTS

JP 2013-60119 A 4/2013

* cited by examiner

*Primary Examiner* — Jacob Knutson
(74) *Attorney, Agent, or Firm* — Crowell & Moring LLP (57) ABSTRACT

An electrical connector assembly, connected to a power source or a detection sensor through a cable, includes (a) a base body made of a synthetic resin, the base body having a bottom surface wall, a side surface wall standing up from a periphery of the bottom surface wall, and an interior space defined on the bottom surface wall and enclosed by the side surface wall; and (b) a connector body for achieving an electrical connection, the connector body extending from the bottom surface wall along the side surface wall through the interior space. The bottom surface wall of the base body has an inclined plane that is inclined in relation to a horizontal plane. The interior space of the base body is filled with a sealing agent by allowing the sealing agent to flow down on the inclined plane by gravity.

15 Claims, 5 Drawing Sheets

ELECTRICAL CONNECTOR ASSEMBLY, ELECTRONIC CONTROL UNIT USING SAME, AND ELECTRIC POWER STEERING SYSTEM THEREWITH

TECHNICAL FIELD

The present invention relates to an electrical connector assembly which is connected to a power source wire or a signal wire, an electronic control unit using the electrical connector assembly, and an electric power steering system using the electronic control unit.

BACKGROUND OF THE INVENTION

To electronically control a control equipment or a control system of various industrial machineries, generally a power source, a control equipment, or a detection sensor is electrically connected to an electronic control unit through a cable. For example, the electric power steering system for an automobile is configured so that, a turning direction and a turning torque of a steering shaft that turns by a driver's operation of a steering wheel are detected, and on the basis of these detection values the electric motor is driven so as to rotate in the same direction as the turning direction of the steering shaft, thereby generating the steering assist torque. The electric power steering system s provided with an electronic control unit (ECU) to control this electric motor.

A conventional electric power steering system is disclosed in Japanese Patent Application Publication 2013-060119, corresponding to US Patent Application Publication 2013/062137. In this patent publication, an electric power steering system comprising an electric motor and an electronic control unit is described. Moreover, the electric motor is housed in a motor housing which has a cylindrical portion made of aluminum alloy etc. The electronic control unit is housed in an ECU housing which is placed on the opposite side to an output shaft in an axial direction of the motor housing. The electronic control unit housed in the ECU housing is equipped with a power conversion circuit having MOSFET which controls driving of the electric motor and a control circuit for controlling MOSFET, and the output terminal of MOSFET and the input terminal of the electric motor are electrically connected through a bus bar.

Moreover, the electronic control unit housed in the ECU housing is supplied with an electric power from the power source through an electrical connector assembly made of a synthetic resin, and is supplied with detection signals of a driving state, etc. from detection sensors. The electrical connector assembly is connected to the electric control unit by insertion into an insertion hole formed in the ECU housing, and is fixed on the outside surface of the ECU housing by fixing bolts.

SUMMARY OF THE INVENTION

By the way, as the electric power steering system described in Japanese Patent Application Publication 2013-060119 is arranged within an engine room of an automobile, the electric power steering system may frequently get splashed with water due to rainwater or a puddle in case of rain or driving on a road having puddles. Therefore, there is a risk that moisture enters the ECU housing through a contact part between a base body of a synthetic resin forming the electrical connector assembly and a connector body (terminal proper) made of metal to conduct electricity. As a measure to prevent moisture from entering, the base body is made into a bottomed box type, and a sealing agent (potting agent) is poured into the interior space of the base body of a bottomed box type. Thereby moisture can be prevented.

Figure 6:
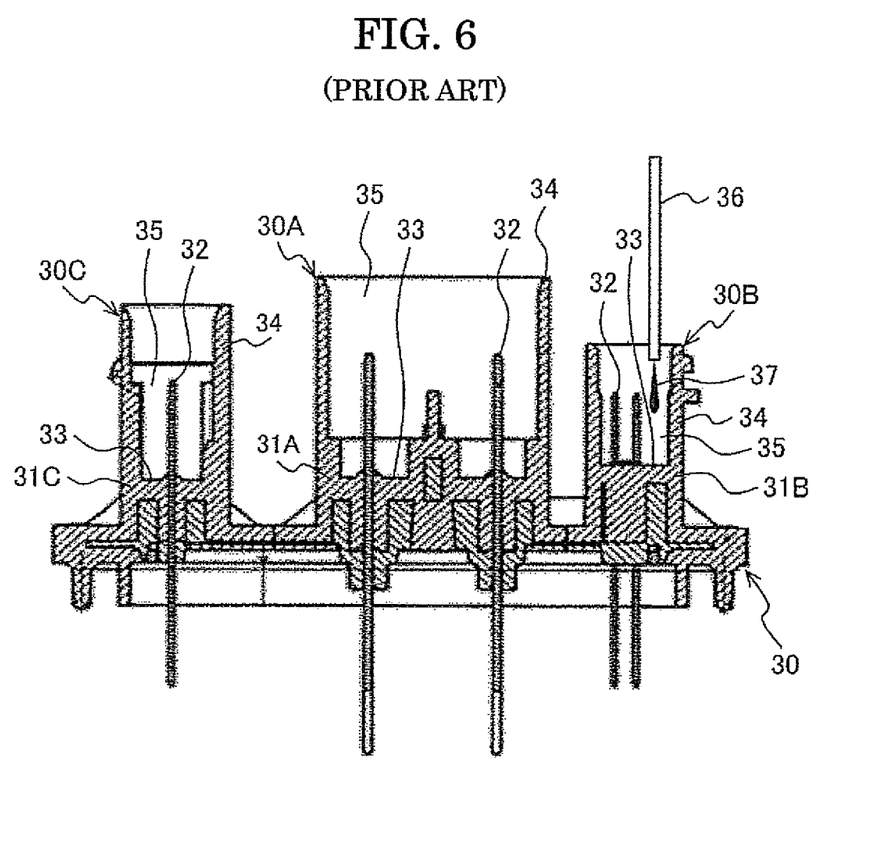
FIG. 6 is an explanatory view showing a step of injecting a sealing agent into a conventional connector terminal part.

FIG. 6 shows a state that a sealing agent is poured into a conventional electrical connector assembly. The electrical connector assembly 30 is made of a synthetic resin, and is equipped with a connector terminal part 30A for power supply, a connector terminal part 30B for a detection sensor, and a connector terminal part 30C for sending a control state to an external device. Connector terminal parts 30A to 30C respectively comprise the base bodies 31A to 31C of a bottomed box type and connector bodies (terminals proper) 32 made of metal passing through these base bodies 31A to 31C. Each of the base bodies 31A to 31C comprises the bottom surface wall 33 and the side surface wall 31 standing up in a vertical direction from the whole circumference of this bottom surface wall 33 and thereby forms an interior space 35.

Moreover, in case of injecting a sealing agent into the interior space 35 formed by this bottom surface wall 33 and the side wall 34, while keeping the bottom surface wall 33 in a horizontal state in relation to the arrangement of the injection nozzle 36, the sealing agent 37 is injected in a state that the injection nozzle 36 is kept in the interior space 35. However, as miniaturization is attempted in recent electronic control units, the electrical connector assembly 30 is also miniaturized. Besides, as the number of the connector bodies 32 is large, flow of the sealing agent 37 is easily prevented. Therefore, even if the sealing agent 37 is injected from the injection nozzle 36, the sealing agent 37 isn't spread as it doesn't flow wholly, and thereby a sealing defect occurs.

Therefore, a sealing agent 37 having a low viscosity was selected, and there were taken measures such as (1) applying pressure on the sealing agent 37 after injection, (2) injecting the sealing agent 37 from several injection nozzles 36, and (3) increasing the injection pressure of the sealing agent 37. It was, however, impossible to make the sealing agent 37 flow and spread stably because of a large number of the connector bodies 32 and the miniaturization of the base body 31 as mentioned above. Therefore, it is necessary to develop a new electrical connector assembly in which the sealing agent 37 can be spread stably by a simple method.

It is an object of the present invention to provide a new electrical connector assembly in which a sealing agent can be spread stably, an electronic control unit using the same, and an electric power steering system therewith.

A characteristic of the present invention is that a bottom surface wall formed on a base body of an electrical connector assembly is made into an inclined bottom surface wall having a plane inclining against a horizontal direction, and that a sealing agent is injected onto the inclined bottom surface so as to flow down by gravitation.

Advantageous Effect of the Invention

According the present invention, as a sealing agent can be made to flow and spread stably in the interior space of a base body by a simple method, it becomes possible to seal a gap between the base body and the connector body (terminal proper).

DETAILED DESCRIPTION

Hereinafter, embodiments of the present invention are explained in detail while using the drawings. However, the present invention is not limited to the following embodiments and also includes various variations or application embodiments in the technological concept of the present invention.

A structure of a steering device and an electric power steering system applying the present invention are explained briefly before explaining the embodiments of the present invention.

Figure 1:
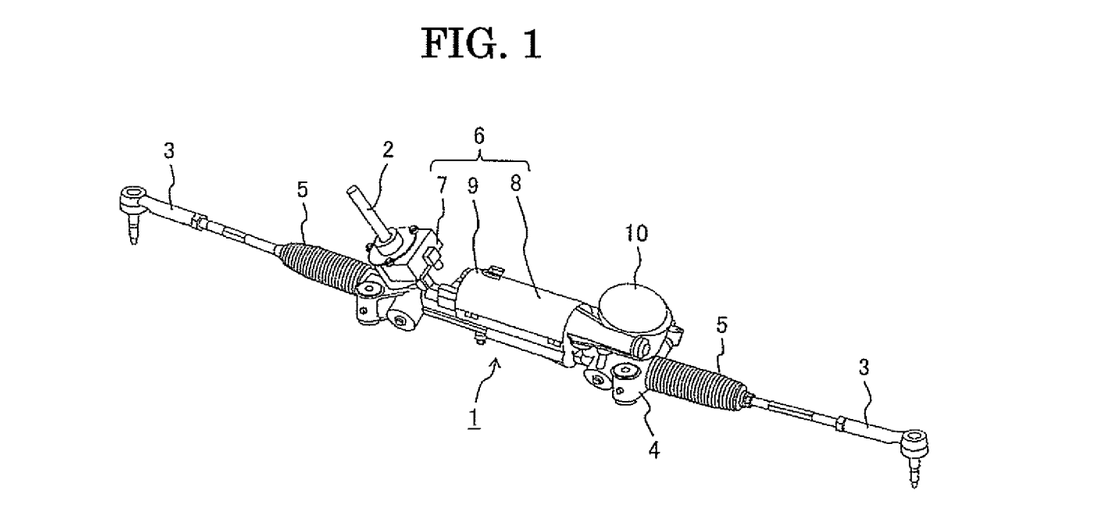
FIG. 1 is a perspective view showing the entirety of a steering device applying the present invention.

First, a steering device to steer front wheels of an automobile is explained. A steering device 1 is constituted as shown in FIG. 1. A pinion (not shown) is provided at a lower end of a steering shaft 2 that is connected to a steering wheel (not shown), and the pinion is engaged with a rack (not shown) that extends in a right and left direction of the car body. Tie rods 3 for steering the front wheels in right and left directions are linked to both ends of the rack, respectively. The rack is covered with a rack housing 4. Between the rack housing 4 and each tie rod 3, a rubber boot 5 is provided.

An electric power steering system 6 is provided to assist driver's steering effort by providing torque upon a turning operation of the steering wheel. That is, the electric power steering system 6 has a torque sensor 7 that detects a turning direction and a turning torque of the steering shaft 2, an electric motor 8 that provides a steering assist force to the rack through a gear 10 on the basis of a detection value of the torque sensor 7, and an electronic control unit (ECU) 9 that controls the electric motor 8. The electric motor 8 of the electric power steering system 6 is connected to the gear 10 through bolts (not shown) at three positions of an outer peripheral part on the side of an output shaft. The electric control unit 9 is provided on the opposite side of the output shaft of the electric motor 8.

Figure 2:
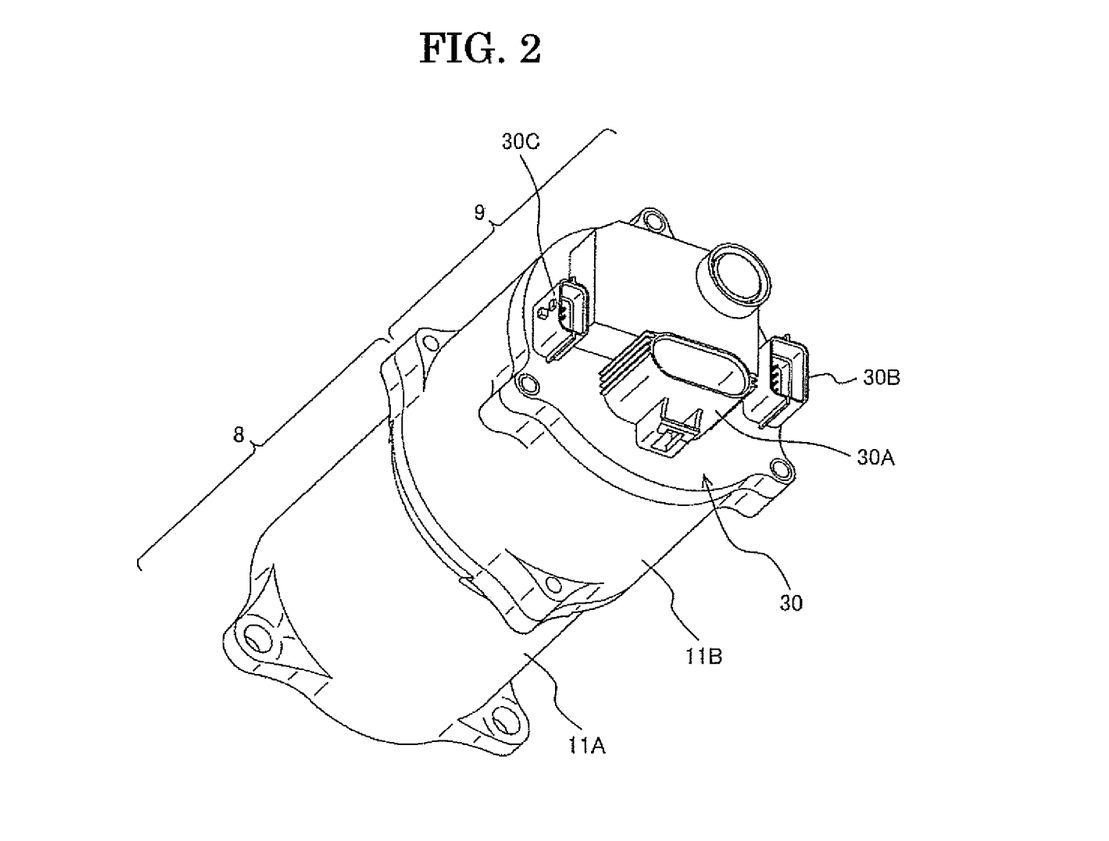
FIG. 2 is a perspective view showing the entirety of an electric power steering system according to the present invention.

As shown in FIG. 2, the electric motor 8 is housed in a motor housing 11A which has a cylindrical portion made of aluminum alloy, etc. The electric control unit 9 is housed in an ECU housing 11B made of aluminum alloy, etc. and arranged on the opposite side of the output shaft in an axial direction of the motor housing 11A.

The motor housing 11A and the ECU housing 11B are fixed integrally at their opposite end surfaces by fixing bolts. The electric control unit 9 housed within the ECU housing 11B is equipped with a power conversion circuit which has MOSFET controlling driving of the electric motor 8 and an electric control assembly comprising a control circuit controlling this MOSFET. An output terminal of the MOSFET and an input terminal of the electric motor 8 are electrically connected through a bus bar.

An electrical connector assembly 30 made of a synthetic resin, which is also used as a lid body 12, is fixed on an end surface of the ECU housing 11B by fixing bolts. The electrical connector assembly 30 is equipped with a connector terminal part 30A for power supply, a connector terminal part 30B for a detection sensor, and a connector terminal part 30C for sending a control state to an external device. Furthermore, the electric control unit 9 housed in the ECU housing 11B is supplied with electric power from a power source through the connector terminal part 30A of the electrical connector assembly 30 made of a synthetic resin, supplied with detection signals such as a driving state from detection sensors through the connector terminal part 30B, and sends the current control state signals of the electric power steering system through the connector terminal part 30C.

Now, although the electrical connector assembly 30 has a shape for covering the whole opening part of the ECU housing 11B, it may be made into a structure that the electrical connector assembly 30 is connected to the electric control assembly by an insertion into an insertion hole formed on the ECU housing 11B after making the electrical connector assembly 30 into a smaller size.

Figure 3:
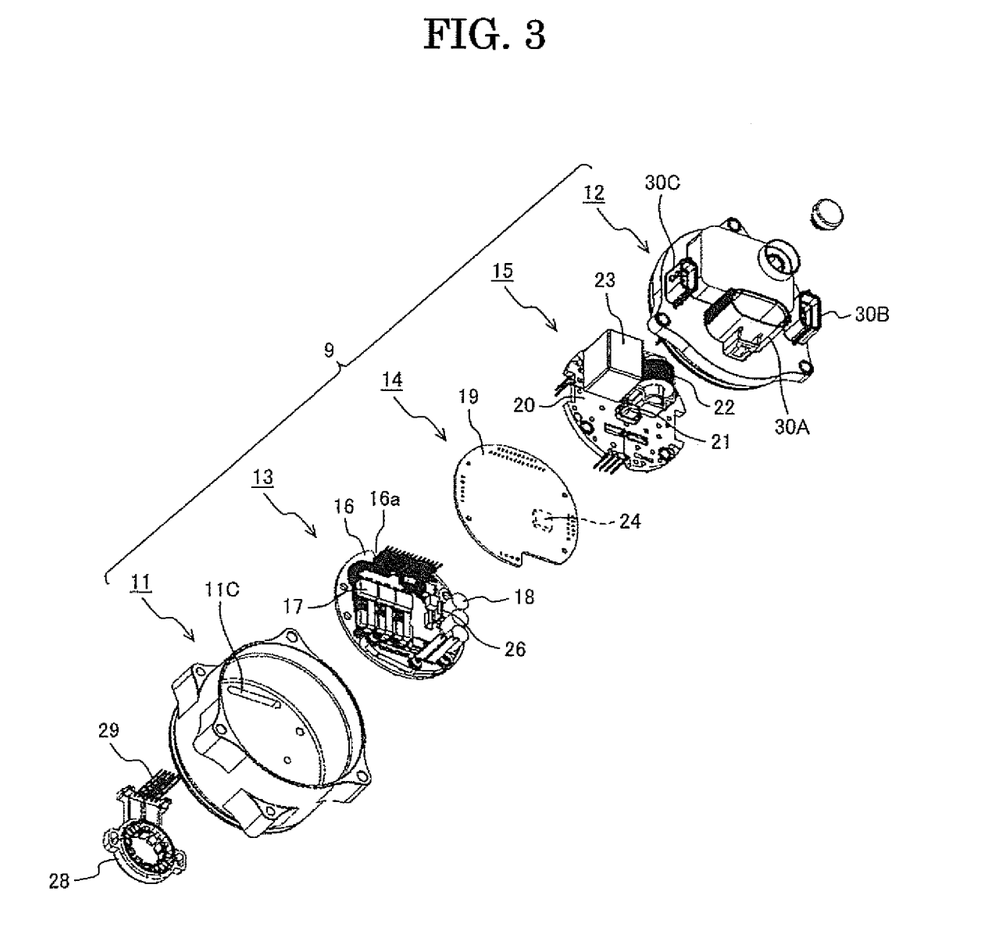
FIG. 3 is an exploded perspective view of an ECU in the electric power steering system.

FIG. 3 shows an exploded perspective view of the ECU housing 11B in the electric steering system 6. The electronic control unit 9 is constituted by the ECU housing 11B having a bottomed cylindrical shape, whose bottom is positioned on the opposite side of the output shaft (not shown) of the electric motor 8, the lid body 12 which also serves as the electrical connector assembly 30 combined with the ECU housing 11B through three bolts (not shown), and the electronic control assembly comprising a power conversion circuit part 13, a control circuit part 14, a filter circuit part 15 etc., which are housed in a housing space constituted by the ECU housing 11B and the lid body 12.

The power conversion circuit part 13 is constituted by mounting on a metal substrate 16 a MOSFET 17 as a semiconductor switch to drive and control the electric motor 8. Designated by numeral 18 is a capacitor. The control circuit part 14 is for controlling the MOSFET 17 etc. and constituted by mounting a microcomputer 24 and other electronic components (not shown) on a surface, opposite to the power conversion circuit part 13, of the first printed substrate 19 as a printed substrate. The filter part 15 is constituted by mounting a capacitor 21, a coil 22, a relay 23, etc. on the second printed substrate 20.

The electrical connector assembly 30, which is also the lid body 12, is for covering the opening of the ECU housing 11B, and the connector terminal parts 30A-30C are formed on its outside surface. Through these connector terminal parts 30A-30C, electric power is supplied from a power source (not shown) to the power conversion circuit part 13 and the control circuit part 14. A signal of a detection sensor, etc. is also input in the same way.

The metal substrate 16 is arranged nearby an internal bottom surface of the ECU housing. The first printed substrate 19 is arranged by the opening side of the metal substrate 16 in the ECU housing 11. The microcomputer 24, which is an exothermic electronic component, is mounted on a surface, opposite to the metal substrate 16, of the first printed substrate 19. Furthermore, the microcomputer 24 and the metal substrate 16 are connected through a heat transmitting member 26.

Now, designated by the numeral 28 in FIG. 3 is a stator which constitutes a resolver by being housed within the electric motor 8 and is for detecting the rotation number of the output shaft from the rotation number of a rotor (not shown) fixed to an output shaft (not shown) of the electric motor 8. Six resolver terminals 29 which are arranged along the direction of the axis are provided to send the rotation number of the output shaft detected by the resolver to the control circuit part 14. The stator 28 and the printed substrate 19 are connected by inserting the resolver terminals 29 into a long hole 11C of the ECU housing 11 and a cutout part 16*a* of the metal substrate 16.

An electric power steering unit having the above-mentioned constitution is actually installed in a steering device for its use. However, as the steering device is arranged within the engine room of an automobile, the electric power steering system may frequently get splashed with water due to rainwater or a puddle in case of rain or driving on a road having puddles.

Therefore, as stated above, there is a risk that moisture enters the ECU housing through a contact part between a base body of a synthetic resin forming the electrical connector assembly and a connector body (terminal proper) to conduct electricity and achieve an electrical connection. As a measure to prevent moisture from entering, the base body is made into a bottomed box type, and a sealing agent (potting agent) is poured into an interior space of the base body of a bottomed box type. Thereby it can be prevented.

However, as miniaturization is attempted in recent electronic control units, the electrical connector assembly is also miniaturized, and besides the number of the connector bodies (terminals proper) is large. Therefore, even if the sealing agent is injected from the injection nozzle 36, the sealing agent doesn't flow and spread wholly, thereby a sealing defect occurs.

1st Embodiment

The present embodiments are for proposing the following structures to solve the above-mentioned sealing defect. That is, a sealing agent is injected so as to flow down by gravitation after making a bottom surface wall formed on a base body of the electrical connector assembly into an inclined plane. By means of this, the sealing agent can be stably spread in an interior space of the base body to occupy the interior space by a simple method. Therefore, it becomes possible to perfectly seal a gap between the base body and the connector body (terminal proper).

Figure 4A:
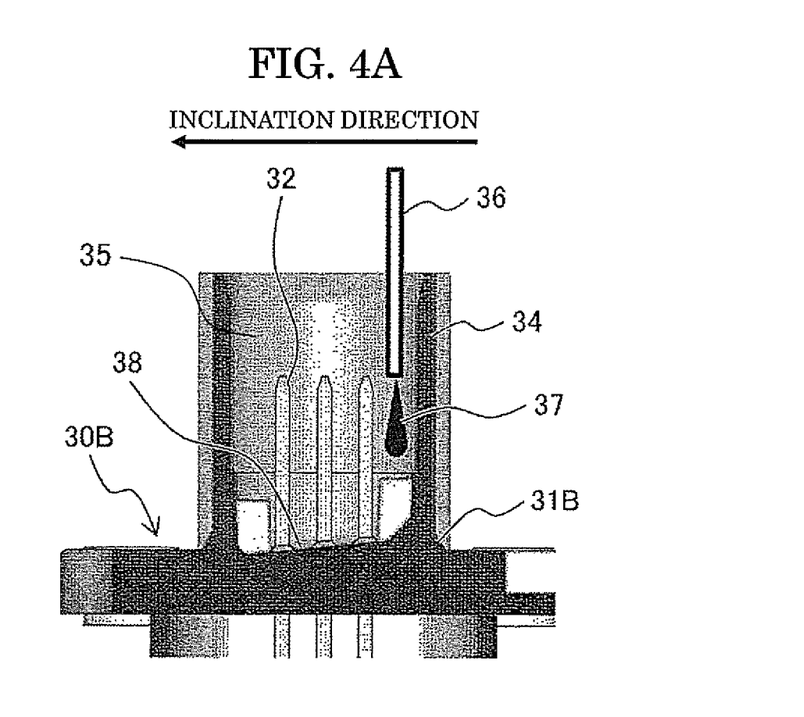
FIG. 4A is an explanatory view showing a step of injecting a sealing agent into a connector terminal part, which is an embodiment of the present invention.

The connector terminal part shown in FIG. 4A is a connector terminal part 30B to send a detection signal from a sensor to the electronic control assembly. In the connector part 30B, a base body 31B is constituted of an inclined bottom surface wall 38 having an inclined plane which inclines against a horizontal state and a side surface wall 34 standing up in a vertical direction from the whole circumference of this inclined bottom surface wall 38, and thereby an interior space 35 is formed. Furthermore, since the connector terminal part 30B is of a signal system, plural connector bodies 32 are provided, and they are square in cross section and are small in size.

Furthermore, an injection nozzle 36 is lowered from an upper side to the inside of the side surface wall 34 of a side at which height of the inclined bottom surface wall 38 is the highest, and in this state a sealing agent is injected at a predetermined pressure. The injected sealing agent 37 flows down along the inclined plane of the inclined bottom surface wall 38 by gravitation and reaches the side surface wall 34 of a side at which height of the inclined bottom surface wall 38 is the lowest. It can be filled with the sealing agent 37 to a predetermined height by injecting the sealing agent 37 from the injection nozzle 36.

In case of the present embodiment, since the connector terminal part 30B (see FIG. 4A) is of a signal system, the connector body (terminal proper) 32 is relatively small in size. Therefore, even if a lot of connector bodies 32 exist, the inclination direction of the inclined bottom surface wall 38 and the arrangement direction of the connector body 32 have no limitation, so fluidity of the sealing agent 37 is not affected widely.

In contrast with this, since the connector terminal part 30A is for connecting a power line to drive the electric motor 8, the connector body 32 is a relatively large connector whose transverse section is rectangular. Therefore, in contrast with FIG. 4B, in case that the inclination direction of the inclined bottom surface 38 is arranged to be perpendicular to the longitudinal direction in the transverse section of the connector body 32, there is a risk of blocking flow of the injected sealing agent 37.

Figure 4B:
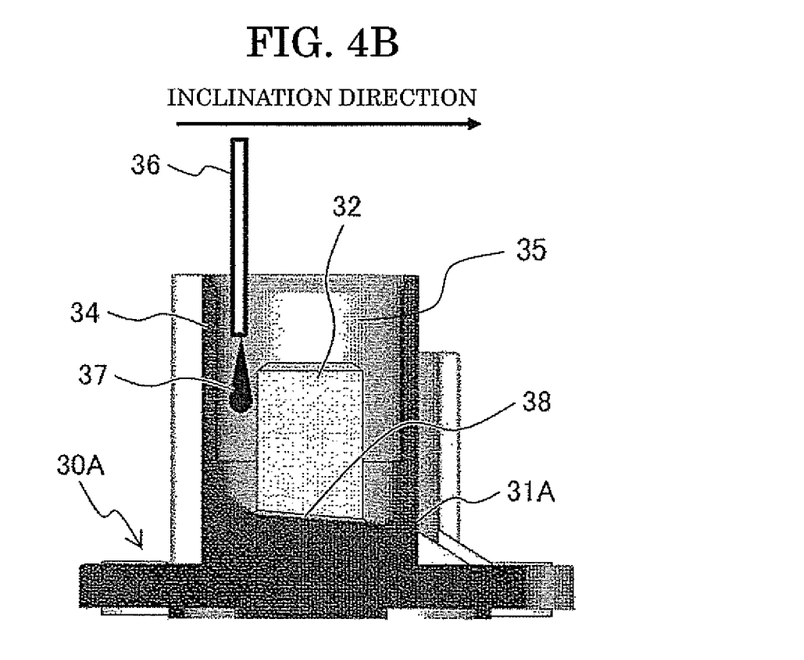
FIG. 4B is an explanatory view showing a step of injecting a sealing agent into another connector terminal part, which is an embodiment of the present invention.

Therefore, as shown in FIG. 4B, in the connector terminal part 30A, the inclination direction of the inclined bottom wall 38 is arranged to be parallel with the longitudinal direction in the transverse section of the connector body 32. Furthermore, the injection nozzle 36 is lowered from an upper side to the inside of the side surface wall 34 at a side at which height of the inclined bottom surface wall 38 is the highest, and in this state the sealing agent 37 is injected under a predetermined pressure. Although the injected sealing agent 37 flows down along the inclined plane of the inclined bottom surface wall 38 by gravitation, the longitudinal direction in the transverse section of the connector body 32 is along the inclination direction of the inclined bottom surface wall 38. Therefore, its fluidity is saved. Furthermore, the injected sealing agent 37 reaches the side surface wall 34 at a side at which height of the inclined bottom surface wall 38 is the lowest. After that, it is possible to fill a bottom space of the connector terminal part 30A with the sealing agent 37 to reach a predetermined height by further injecting the sealing agent 37 from the injection nozzle 36.

Furthermore, although the inclined planes of the inclined bottom surface walls 38 are straight in embodiments shown in FIG. 4A and FIG. 4B, they may be curved or arc-shaped. Furthermore, they may be a combination of a straight portion and an arc-shaped portion.

In this way, according to the present embodiment, there is provided a structure that a sealing agent is injected so as to flow down by gravitation on an inclined plane of a bottom surface wall of a base body of the electrical connector assembly. By means of this, as the sealing agent can be made to stably flow and spread in an interior bottom space of the base body by a simple method, it becomes possible to perfectly seal a gap between the base body and the connector body.

2nd Embodiment

Next, another embodiment of the present invention is explained. Also in this embodiment, a bottom surface wall formed on a base body of an electrical connector assembly is formed of two inclined planes which meet at a bottom center line, and a sealing agent is injected so as to flow down by gravitation. By means of this, as the sealing agent can be stably spread in an interior bottom space of the base body by a simple method to fill the interior bottom space, it becomes possible to perfectly seal a gap between the base body and the connector body.

Figure 5A:
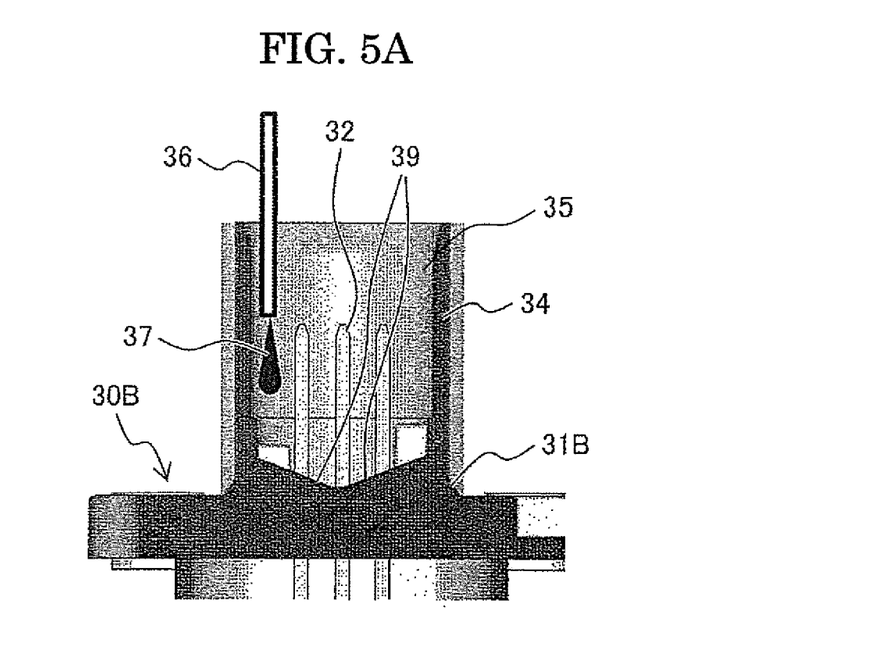
FIG. 5A is an explanatory view showing a step of injecting a sealing agent into a connector terminal part, which is another embodiment of the present invention.

A connector terminal part shown in FIG. 5A is a connector terminal part 30B of an electrical connector assembly 30. In the connector part 30B, the base body 31B is constituted of an inclined bottom surface wall 39 having two inclined planes which meet at a bottom center line and a side surface wall 34 standing up in a vertical direction from the whole circumference of this inclined bottom surface wall 39, and thereby an interior space 35 is formed. A position where two inclined planes meet together is almost near the center of two opposite positions of the inclined bottom surface wall 39, and the two inclined planes in a vertical section (see FIG. 5A) is V-shaped. Furthermore, the connector bodies 32 of the connector terminal part 30B have the same structures as those of the 1st embodiment.

Furthermore, an injection nozzle 36 is lowered from an upper side to the inside of the side surface wall 34 on one of the two sides at which height of the inclined bottom surface wall 38 is the highest, and in this state a sealing agent is injected under a predetermined pressure. The injected sealing agent 37 flows down on one of the two inclined planes of the inclined bottom surface wall 39 by gravitation and reaches the bottom center line at which height of the inclined bottom surface wall 39 is the lowest. By further injecting the sealing agent 37 from the injection nozzle 36, the sealing agent 37 goes up on the other inclined plane to reach a predetermined height, thereby filling a bottom space of the connector terminal part 30B with the sealing agent 37.

Furthermore, similar to FIG. 4B, since the connector terminal part 30A is for connecting a power line to drive the electric motor 8, the connector body 32 is a relatively large connector whose transverse section is rectangular. Therefore, in contrast with FIG. 5B, in case that the inclination direction of the inclined bottom surface wall 38 is arranged to be perpendicular to the longitudinal, direction in the transverse section of the connector body 32, there is a risk of blocking flow of the injected sealing agent 37.

Figure 5B:
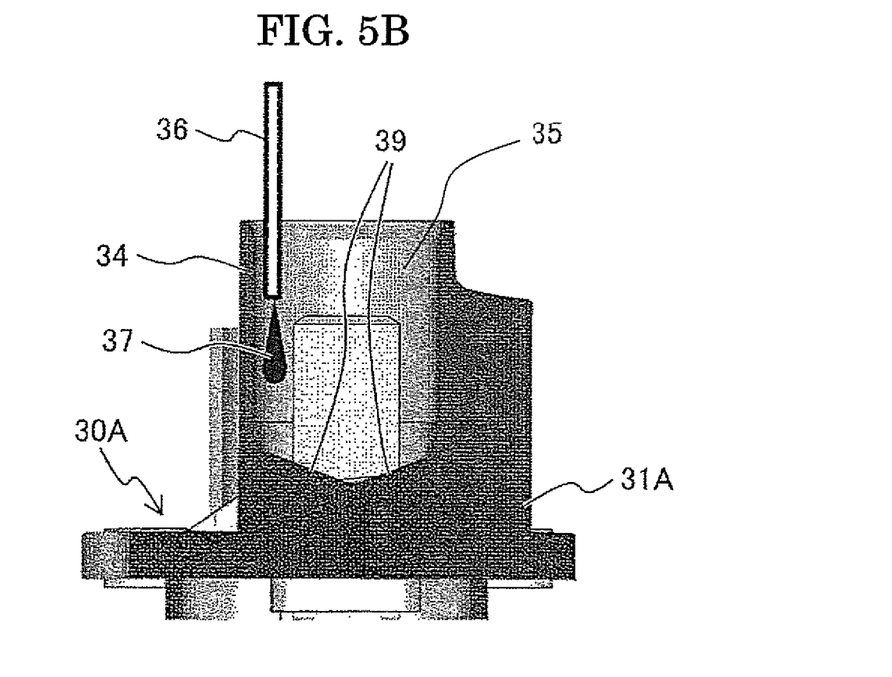
FIG. 5B is an explanatory view showing a step of injecting a sealing agent into another connector terminal part, which is another embodiment of the present invention.

Therefore, as shown in FIG. 5B, in the connector terminal part 30A, the inclination direction of the inclined bottom surface wall 39 is arranged to be parallel with the longitudinal direction in the transverse section of the connector body 32. Furthermore, an injection nozzle 36 is lowered from an upper side to the inside of the side surface wall 34 on a side at which height of the inclined bottom surface wall 39 is the highest, and in this state a sealing agent 37 is injected under a predetermined pressure. The injected sealing agent 37 flows down on one of the two inclined planes by gravitation. In this case too, similar to FIG. 4B, the inclination direction of the inclined plane (see FIG. 5B) is along the longitudinal direction in the transverse section of the connector body 32. Therefore, fluidity of the sealing agent 37 is secured. Then, the injected sealing agent 37 reaches a bottom center line at which the two inclined planes meet together. By further injecting the sealing agent 37 from the injection nozzle 36, the sealing agent 37 goes up on the other inclined plane to reach a predetermined height, thereby filling a bottom space of the connector terminal part 30A with the sealing agent 37.

Furthermore, although the sealing agent 37 is injected from one side where height of the inclined plane is the highest in the present embodiment, it is optional to inject the sealing agent 37 from two sides where height of the inclined plane is the highest. In this way, the sealing agent 37 can be made to flow and spread much more by injecting it from two injection nozzles 36.

Furthermore, although the two inclined planes of the inclined bottom surface wall 39 are formed straight in embodiments shown in FIG. 5A and FIG. 5B, they may be curved or arc-shaped. Furthermore, they may be a combination of a straight portion and an arc-shaped portion.

As mentioned above, there is provided by the present invention a structure that a sealing agent is injected so as to flow down by gravitation on an inclined plane of a bottom surface wall of a base body of the electrical connector assembly. By means of this, as the sealing agent can be made to stably flow and spread in an interior space of the base body by a simple method, it becomes possible to perfectly seal a gap between the base body and the connector body.

Furthermore, the present invention is not limited to the above embodiments but includes various variations. For example, the above embodiments were explained in detail to simply explain the present invention. It is not necessarily limited to one equipped with all structures which were explained. Furthermore, a part of a structure of a certain embodiment can be replaced with a structure of another embodiment, and a structure of another embodiment can be also added thereto. Furthermore, as to a part of a structure of each embodiment, another structure can be added, canceled, or replaced.

What is claimed is:

1. An electrical connector assembly that is connected to a power source or a detection sensor through a cable, comprising:
   a base body made of a synthetic resin, the base body having a bottom surface wall, a side surface wall standing up from a periphery of the bottom surface wall, and an interior space defined on the bottom surface wall and enclosed by the side surface wall; and
   a connector body for achieving an electrical connection, the connector body extending from the bottom surface wall along the side surface wall through the interior space, wherein
   the bottom surface wall of the base body has an inclined plane that gradually inclines, from one end to another end thereof, in relation to a horizontal plane, and
   the interior space of the base body is filled with a sealing agent by allowing the sealing agent to flow down on the inclined plane by gravity.

2. The electrical connector assembly as claimed in claim 1, wherein the sealing agent is discharged from an injection nozzle at a highest position of the inclined plane of the bottom surface wall to fill the interior space of the base body with the sealing agent.

3. The electrical connector assembly as claimed in claim 1, wherein the inclined plane in a vertical section along an inclination direction of the inclined plane is straight, curved, or a combination of a straight portion and a curved portion.

4. The electrical connector assembly as claimed in claim 1, wherein an inclination direction of the inclined plane is arranged along a longitudinal direction of the connector body in a transverse section of the connector body.

5. The electrical connector assembly as claimed in claim 1, wherein the side surface wall is perpendicular to the horizontal plane.

6. An electronic control unit equipped with an electrical connector assembly that is connected to a power source or a detection sensor through a cable, the electrical connector assembly comprising:
   a base body made of a synthetic resin, the base body having a bottom surface wall, a side surface wall standing up from a periphery of the bottom surface wall, and an interior space defined on the bottom surface wall and enclosed by the side surface wall; and a connector body for achieving an electrical connection, the connector body extending from the bottom surface wall along the side surface wall through the interior space, wherein the bottom surface wall of the base body has an inclined plane that gradually inclines, from one end to the other end thereof, in relation to a horizontal plane, and the interior space of the base body is filled with a sealing agent by allowing the sealing agent to flow down on the inclined plane by gravity.

7. The electronic control unit as claimed in claim 6, wherein the sealing agent is discharged from an injection nozzle at a highest position of the inclined plane of the bottom surface wall to fill the interior space of the base body with the sealing agent.

8. The electronic control unit as claimed in claim 6, wherein the inclined plane in a vertical section along an inclination direction of the inclined plane is straight, curved, or a combination of a straight portion and a curved portion.

9. The electronic control unit as claimed in claim 6, wherein an inclination direction of the inclined plane is arranged along a longitudinal direction of the connector body in a transverse section of the connector body.

10. The electronic control unit as claimed in claim 6, wherein the side surface wall is perpendicular to the horizontal plane.

11. An electric power steering system comprising:
an electric motor for providing a steering assist force to a steering shaft;
an electronic control assembly for controlling the electric motor, the electronic control assembly being housed in an ECU housing; and an electrical connector assembly for connecting the electronic control assembly to a power source or a detection sensor through a cable, the electrical connector assembly being fixed to the ECU housing, the electrical connector assembly comprising:
a base body made of a synthetic resin, the base body having a bottom surface wall, a side surface wall standing up from a periphery of the bottom surface wall, and an interior space defined on the bottom surface wall and enclosed by the side surface wall; and
a connector body for achieving an electrical connection, the connector body extending from the bottom surface wall along the side surface wall through the interior space, wherein the bottom surface wall of the base body has an inclined plane that gradually inclines, from one end to the other end thereof in relation to a horizontal plane, and the interior space of the base body is filled with a sealing agent by allowing the sealing agent to flow down on the inclined plane by gravity.

12. The electric power steering system as claimed in claim 11, wherein the sealing agent is discharged from an injection nozzle at a highest position of the inclined plane of the bottom surface wall to fill the interior space of the base body with the sealing agent.

13. The electric power steering system as claimed in claim 11, wherein the inclined plane in a vertical section along an inclination direction of the inclined plane is straight, curved, or a combination of a straight portion and a curved portion.

14. The electric power steering system as claimed in claim 11, wherein an inclination direction of the inclined plane is arranged along a longitudinal direction of the connector body in a transverse section of the connector body.

15. The electric power steering system as claimed in claim 11, wherein the side surface wall is perpendicular to the horizontal plane.

* * * * *